US011111073B2

(12) United States Patent
Kibler et al.

(10) Patent No.: US 11,111,073 B2
(45) Date of Patent: Sep. 7, 2021

(54) CONTAINERS FOR TRANSPORTING PLANTS AND METHODS RELATING THERETO

(71) Applicant: 1769474 ALBERTA LTD., Alberta (CA)

(72) Inventors: Tyler Kibler, Alberta (CA); Bruce Giovando, Alberta (CA); Dieter MacPherson, Alberta (CA); Don Morton, Alberta (CA); Jess Latimer, Alberta (CA); John Barnet, Alberta (CA); Neil Belot, Alberta (CA); Nicholas Fraleigh, Alberta (CA); Nick Whitehead, Alberta (CA); Ankit Sharma, Alberta (CA)

(73) Assignee: 1769474 Alberta Ltd, Edmonton (CA)

( * ) Notice: Subject to any disclaimer, the term of this patent is extended or adjusted under 35 U.S.C. 154(b) by 43 days.

(21) Appl. No.: 16/621,218

(22) PCT Filed: Aug. 31, 2018

(86) PCT No.: PCT/CA2018/051057
§ 371 (c)(1),
(2) Date: Dec. 10, 2019

(87) PCT Pub. No.: WO2019/041048
PCT Pub. Date: Mar. 7, 2019

(65) Prior Publication Data
US 2020/0198881 A1 Jun. 25, 2020

Related U.S. Application Data

(60) Provisional application No. 62/552,954, filed on Aug. 31, 2017.

(51) Int. Cl.
*B65D 85/52* (2006.01)
*A01G 13/00* (2006.01)

(52) U.S. Cl.
CPC .............. *B65D 85/52* (2013.01); *A01G 13/00* (2013.01)

(58) Field of Classification Search
CPC . A01G 7/00; A01G 7/04; A01G 7/045; A01G 13/00; A01G 13/04; B65D 85/52
(Continued)

(56) References Cited

U.S. PATENT DOCUMENTS 9,572,303 B2 * 2/2017 Salojarvi .................. A01G 9/02
10,179,694 B2 * 1/2019 Fenner, Jr. ............. A01G 7/045
(Continued)

FOREIGN PATENT DOCUMENTS

CA 2947752 A1 11/2015
CN 204616536 U * 9/2015 ............... A01G 9/02
(Continued)

OTHER PUBLICATIONS

International Search Report dated Nov. 23, 2018, issued in corresponding International Application No. PCT/CA2018/051057, filed Aug. 31, 2018, 2 pages.

*Primary Examiner* — Bryon P Gehman
(74) *Attorney, Agent, or Firm* — Christensen O'Connor Johnson Kindness PLLC

(57) ABSTRACT

Containers for transporting plants are provided that can include a base having a base recess for receiving a plant and a growing medium or soil, a lid that can attach to the base such that the lid can extend over and enclose the plant within the container, a cover for holding the plant within the base recess that can be mounted within a base opening into the base recess and abutting against the growing medium or soil, at least one light source mounted to an upper surface of the cover, and a tamper-resistant attachment mechanism for
(Continued)

attaching the lid and the base together. Methods for enclosing and transporting plants within containers are also provided.

23 Claims, 7 Drawing Sheets

(58) Field of Classification Search
USPC .............................................. 206/423; 47/84
See application file for complete search history.

(56) References Cited

U.S. PATENT DOCUMENTS

| 2014/0150341 | A1* | 6/2014 | Montgomery | A01G 9/02 |
| | | | | 47/70 |
| 2015/0144519 | A1* | 5/2015 | Tapper | A47F 7/0021 |
| | | | | 206/486 |
| 2015/0313095 | A1* | 11/2015 | Fenner, Jr. | A01G 9/249 |
| | | | | 47/84 |
| 2020/0156860 | A1* | 5/2020 | Huang | A01G 9/02 |

FOREIGN PATENT DOCUMENTS

| CN | 205327846 U | 6/2016 | | |
| CN | 105966784 A | 9/2016 | | |
| CN | 206345170 U | 7/2017 | | |
| NL | 2002088 C2 * | 2/2010 | ............. | A01G 7/045 |

\* cited by examiner

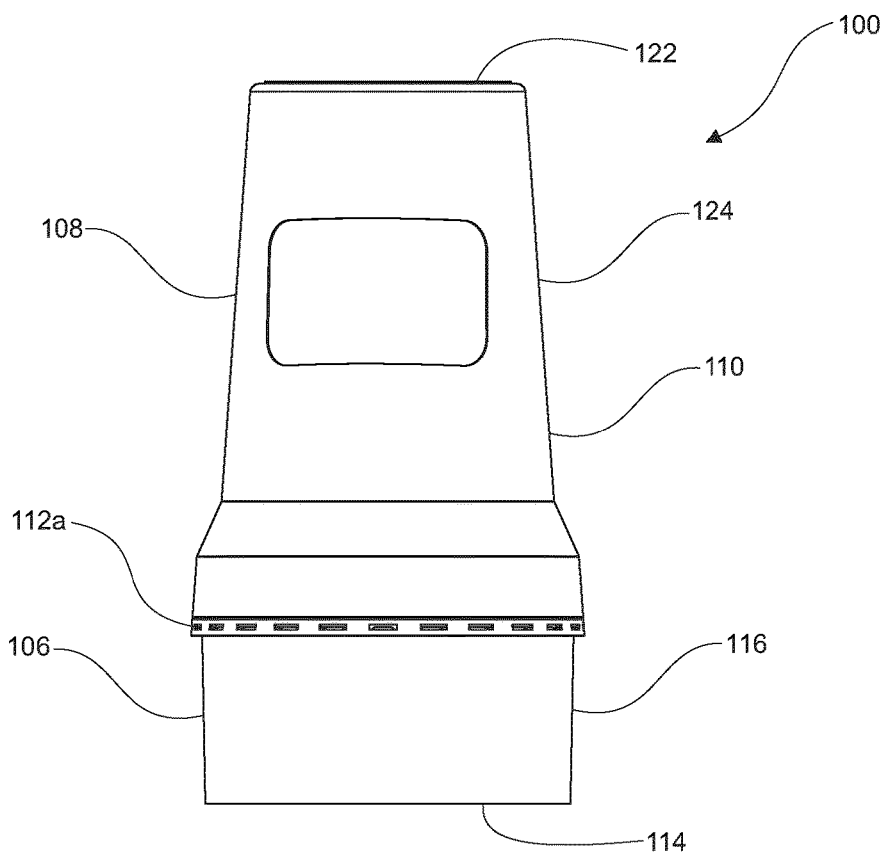
Fig. 2A
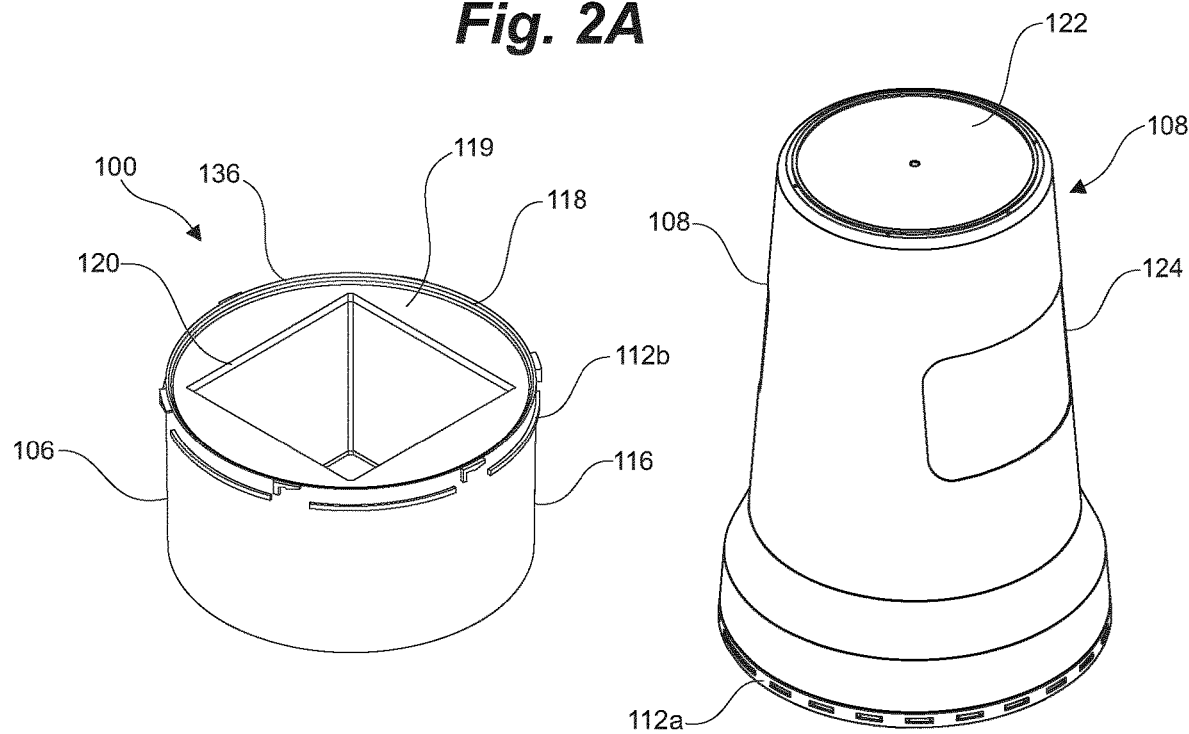
Fig. 2B   Fig. 2C

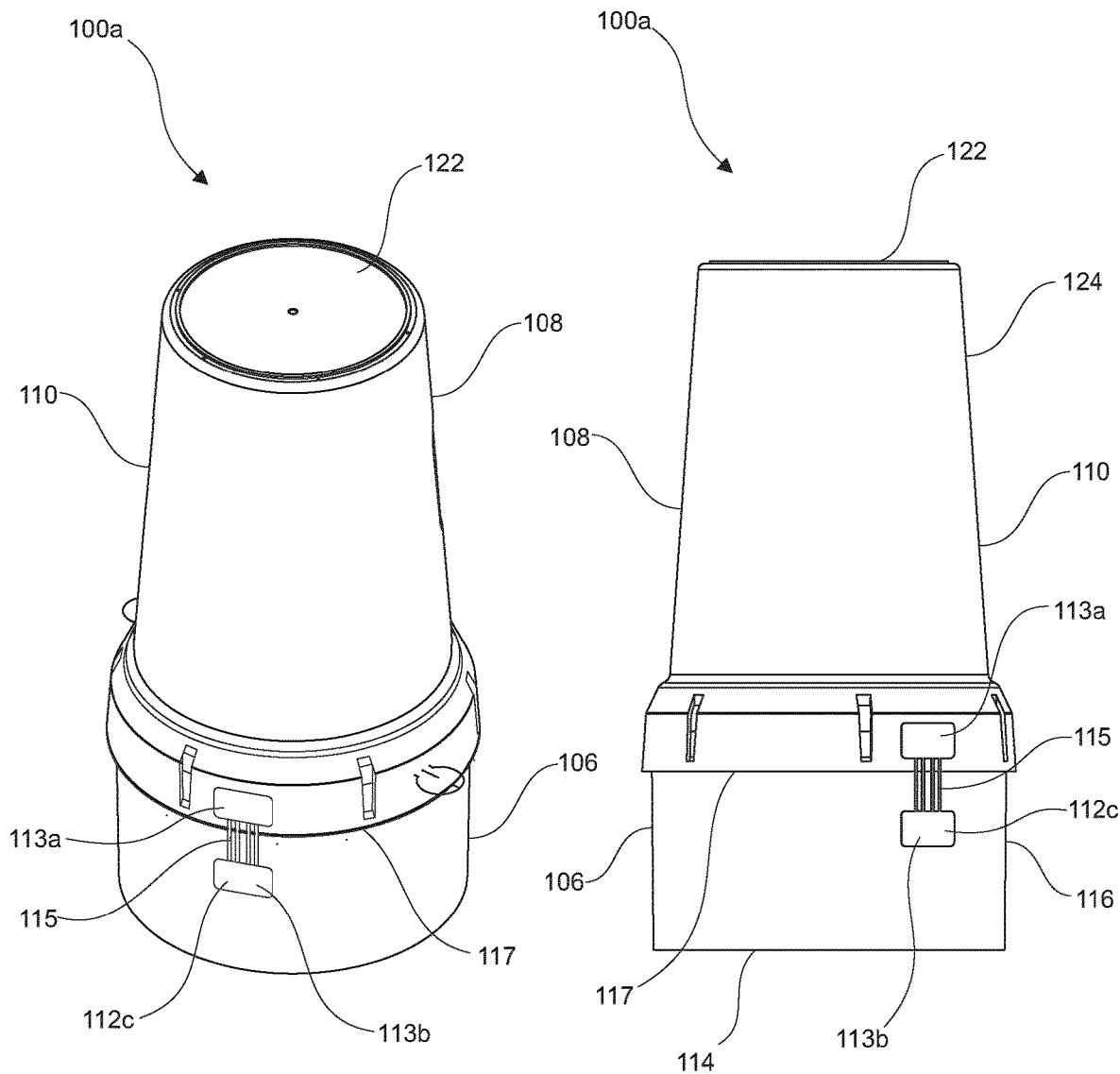
*Fig. 3A*    *Fig. 3B*

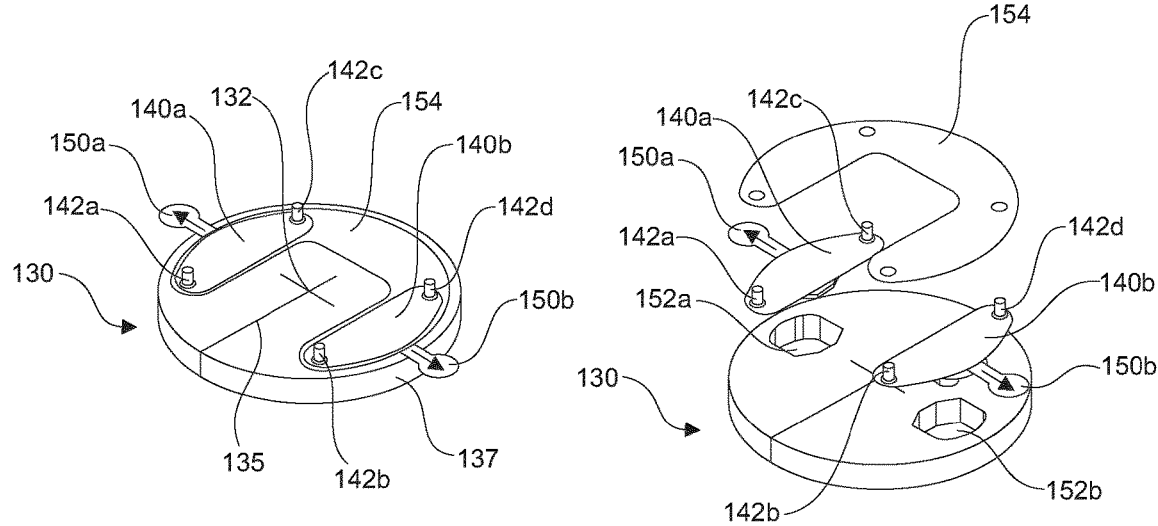
*Fig. 6A*　　　*Fig. 6B*
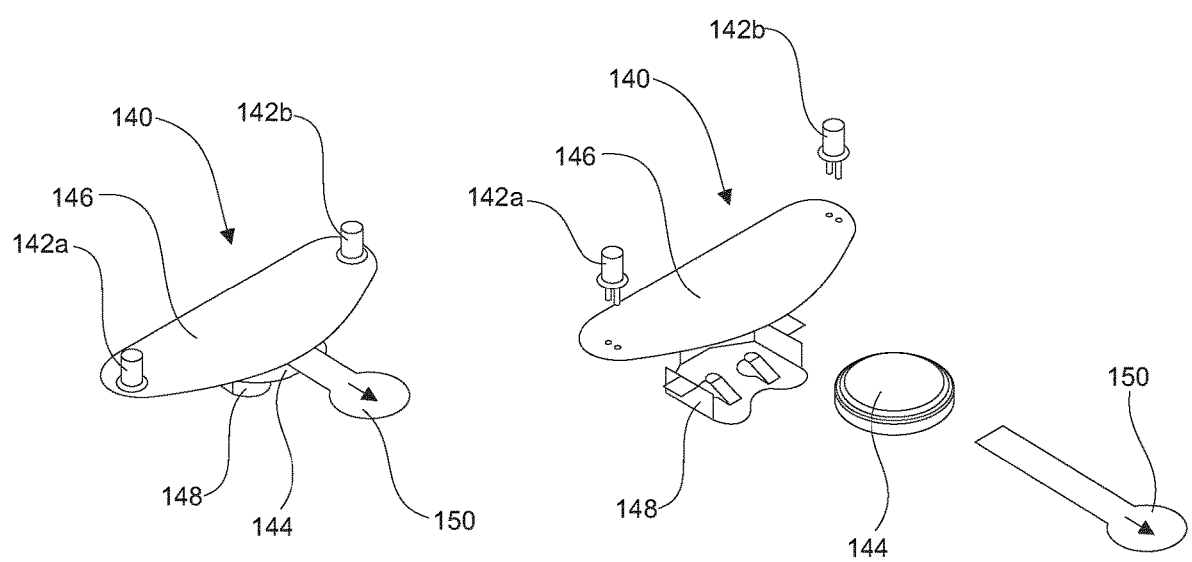
*Fig. 7A*　　　*Fig. 7B*

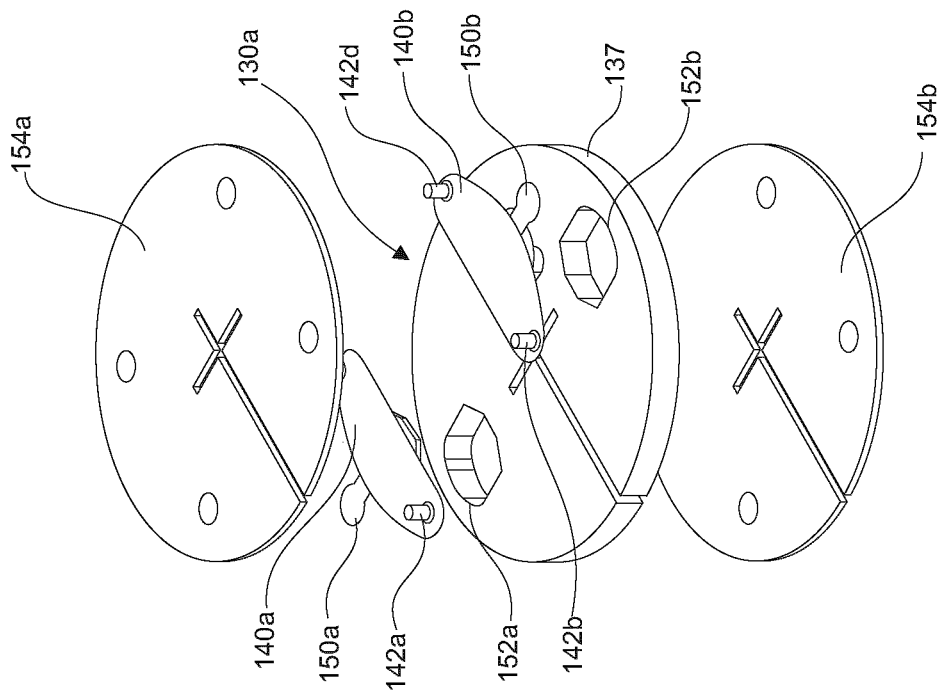
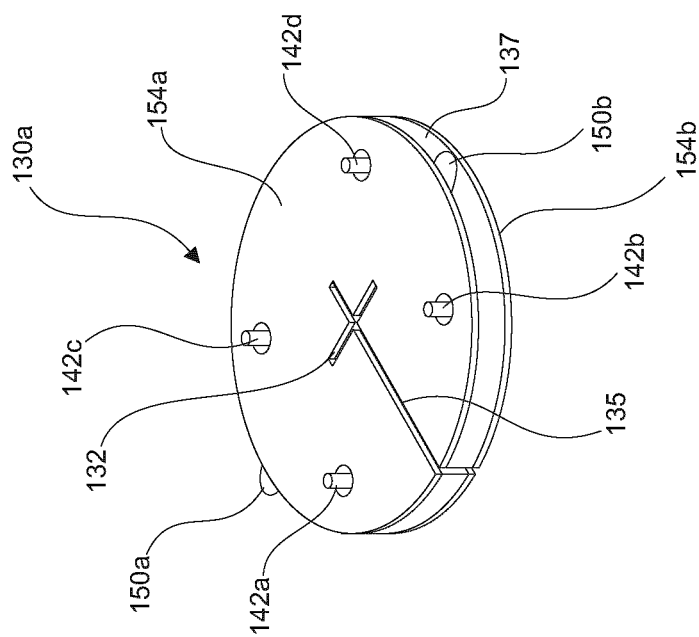
*Fig. 8B*
*Fig. 8A*

CONTAINERS FOR TRANSPORTING PLANTS AND METHODS RELATING THERETO

CROSS-REFERENCE TO RELATED APPLICATION

This application claims the benefit of U.S. Provisional Application No. 62/552,954, filed Aug. 31, 2017, the disclosure of which is incorporated by reference herein in its entirety.

TECHNICAL FIELD

The present disclosure relates to the field of transportation containers, and more particularly, to the field of transportation containers for plants, and related methods of enclosing and transporting plants within in a transportation container.

BACKGROUND

Containers for the transportation plants are known. These containers commonly comprise a base or pot having a recess for receiving the plant and a growing medium or soil. In order to protect the plants, the containers can further comprise a lid that can be attached to the base so that the lid extends over and covers the plant to protect it from being damaged during transportation.

Present transportation containers, however, can suffer from poor lighting access to the plant, which is undesirable since a lack of light can result in either a decrease the overall vitality of the plant, or a transformation of the plant into a growth stage that is unacceptable to a buyer or user.

Transparent lids can be used to allow external light, such as natural light, to pass through the lid and reach the plant. However, if the transportation containers are stored or shipped in a dark environment, the plants will still not be illuminated. In addition, transparent lids allow for the visual identification and assessment of the plants enclosed within the transportation containers. Because plant growers often rely on third party shipping companies to transport their plant to the buyers, growers often want plants, such as medicinal or decorative plants, to be transported inconspicuously. As such, transparent lids can be undesirable.

Light sources have also been used in transportation containers in an attempt to ensure that the plant receives sufficient constant light to grow during transportation. A light source for the plant is commonly positioned somewhere on the lid of the container, above the plant. In this arrangement, the light source produces light for the plants from a specific height above the plants, such that the light reaches the plants from above. A light source arranged above the plant, however, only provides sufficient lighting for the uppermost parts of the plant. The lower parts of the plants, located in the shadow of the uppermost parts and do not receive sufficient lighting. Further, if a transparent lid is used, positioning a light source on the lid may create a shadow for any possible external light available and thereby blocking the external light from reaching the plant.

Accordingly, there remains a need in the art for containers and methods to transport plants in containers that mitigate or ameliorate the shortcomings of the prior art.

SUMMARY

The present disclosure relates to containers for transporting plants and methods of enclosing and transporting plants within a transportation container.

Broadly stated, in some embodiments, a container for transporting a plant is provided, comprising: a base defining a base recess for receiving the plant and a growing medium or soil; a lid defining a lid recess, the lid being attachable to the base such that the lid extends over and encloses the plant within the container; a cover mountable to the base for holding the plant within the base recess; at least one light source mounted to an upper surface of the cover; and a tamper-resistant attachment mechanism mounted on the container for attaching the lid and the base together during transport.

In some embodiments, the cover is mountable to the base within the base opening and abutting against the growing medium or soil contained the base recess.

In some embodiments, either, or both, the lid and the base can be frusto-conical or conically-shaped. In some embodiments, the diameter of the lid recess can measure at least 3.5 inches.

In some embodiments, the cover can be a circular disc configured to fit within a base inner side wall formed on the base. In some embodiments, the circular disc can further comprise a hole configured to receive a stem of the plant positioned within the base recess, and a side slot that can extend from a perimeter edge of the disc to the hole. In some embodiments, the circular disc can be made of foam, and the diameter of the circular disc can be configured to press against the circular inner side wall and hold the circular disc in position. In some embodiments, the circular disc can be comprised of ethylene-vinyl acetate foam.

In some embodiments, each of the at least one light source can comprise one or more LED bulbs and one or more batteries for energizing the LED bulbs. In some embodiments, each of the at least one light source can comprise two LED bulbs and one battery in electrical communication with the two LED bulbs. In some embodiments, the one or more LED bulbs can be oriented approximately perpendicular to the upper surface of the cover and the LED bulbs generate a light that shines upward to the plant. In some embodiments, each of the at least one light source can further comprise a removable battery isolation strip positioned in the light source to interrupt the electrical communication between the two LED bulbs and battery. In some embodiments, removing the battery isolation strip can cause the batteries to energize the LED bulbs and illuminate the light source. In some embodiments, the lid, when attached to the base, can push down on the at least one light source and can hold the at least one light source in position mounted on the cover.

In some embodiments, the lid can be translucent or opaque. In some embodiments, the lid recess can be defined by a lid inner surface and the lid inner surface can reflect light. In some embodiments, the inner surface can be textured to diffuse light reflected by the inner surface.

In some embodiments, the attachment mechanism can comprise a perforated removable tear strip mounted to a bottom edge of the lid and at least one horizontally positioned tab formed on the base extending radially outward from an exterior surface near the top of the base. In some embodiments, the attachment of the base to the lid can comprise the tear strip engaging the one or more tabs to prevent the lid and the base from being separated after being initially attached together. In some embodiments, the attachment mechanism can comprise a tamper-evident adhesive label that can be placed across a seam formed between the lid and the base when attached together. In some embodiments, separating the lid from the base can require cutting or breaking the adhesive label.

In some embodiments, the plant to be contained and transported can be a can be a medicinal or decorative plant, although it would be understood that other plants of value could benefit from the containers and methods described herein. In some embodiments, the plant to be contained and transported can be maintained in a vegetative growing stage during transport.

Broadly stated, in some embodiments, a method of enclosing a plant within a transportation container is provided, the method comprising the steps of: positioning the plant and a growth medium or soil within base recess defined by a base of a container; mounting a cover to the base, the cover mounted over the base recess and abutting the growth medium or soil to hold the plant within the base; illuminating at least one light source mounted to an upper surface of the cover; and enclosing the plant within the container by attaching a lid to the base so that the lid extends over the plant and encloses the plant within the container.

In some embodiments, the illuminating the at least one light source step can comprise energizing at least one LED bulb with at least one battery by removing a battery isolation strips positioned to disrupt an electrical communication between the at least one LED bulb and the at least one battery. In some embodiments, the enclosing the plant within the container step can comprise engaging a tamper-resistant attachment mechanism mounted on the lid for attaching the lid and the base together during transport.

In some embodiments, the methods can further comprise the step of transporting the plant within the transportation container.

Additional aspects and advantages of the present disclosure will be apparent in view of the description, which follows. Is should be understood, however, that the detailed description and the specific examples, while indicating embodiments of the disclosure, are given by way of illustration only, since various changes and modifications within the scope of the disclosure will become apparent to those skilled in the art from this detailed description.

BRIEF DESCRIPTION OF THE DRAWINGS

The containers and related methods will now be described by way of an exemplary embodiment with reference to the accompanying drawings. In the drawings:

FIG. 2A is a side elevation view of the embodiment shown in FIG. 1;

FIG. 2B is a perspective view of a base used in the embodiment shown in FIG. 1;

FIG. 2C is a perspective view of a lid used in the embodiment shown in FIG. 1;

FIG. 3A is a perspective view of an embodiment of a container for transporting plants, as described herein;

FIG. 3B is a side elevation view of the embodiment shown in FIG. 3A;

FIG. 6A is a perspective view of an embodiment of a cover used in the embodiment shown in FIG. 1;

FIG. 6B is an exploded view of the cover shown in FIG. 6A;

FIG. 7A is a perspective view of a light source used in the embodiment shown in FIG. 1;

FIG. 7B is an exploded view of the light source shown in FIG. 6A;

FIG. 8A is a perspective view of an embodiment of a cover; and

FIG. 8B is an exploded view of the cover shown in FIG. 8A.

DETAILED DESCRIPTION

Figure 1:
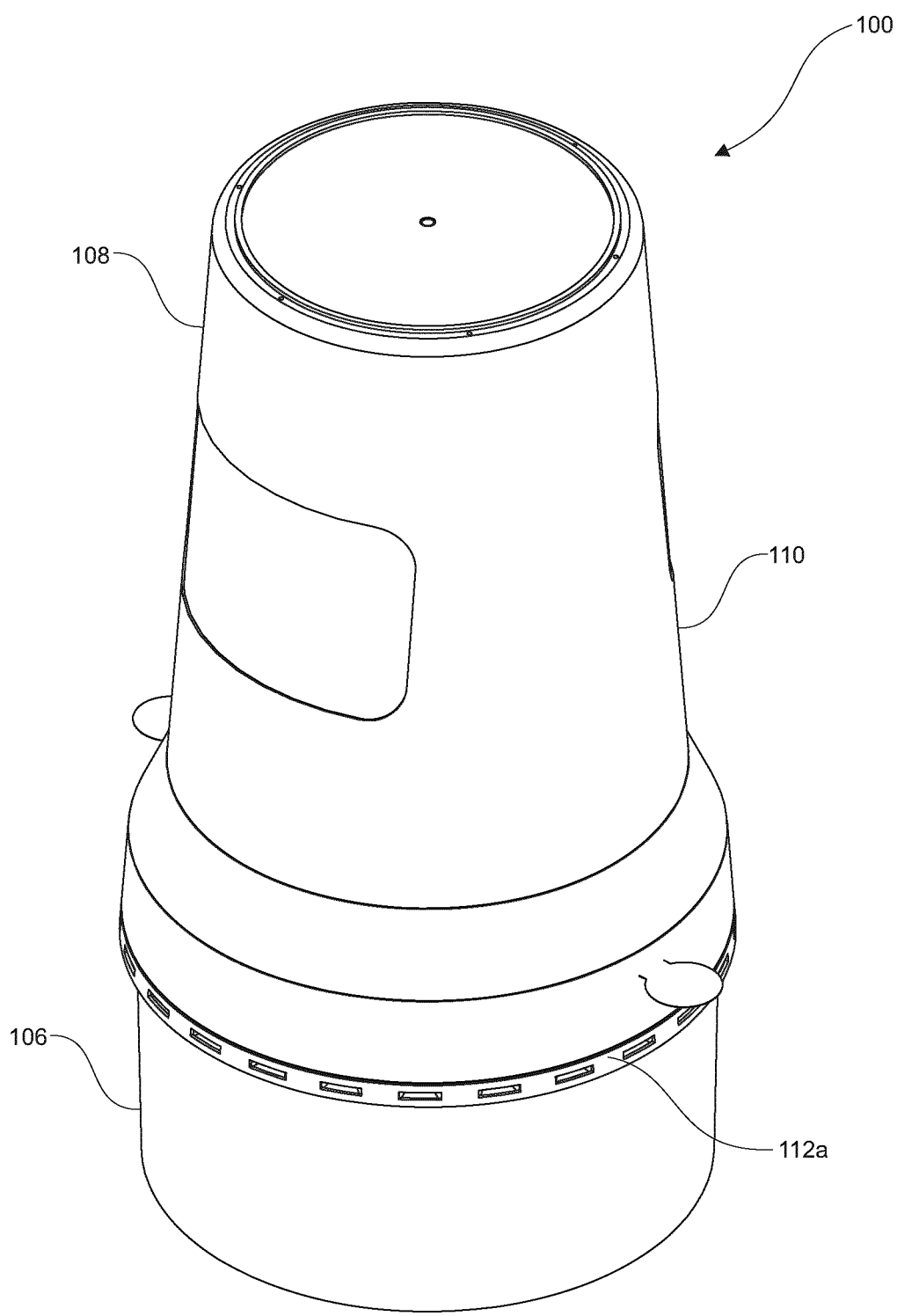
FIG. 1 is a perspective view of an embodiment of a container for transporting plants, as described herein.

Before the present apparatus and methods are described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

As used herein, the term "plant" can refer to any living organism has a stem, leaves, and roots. As used herein, the term "live plant" or "living plant" can refer to any plant that is alive, and not dead, and is growing with the roots positioned in a growth medium or soil.

As used herein, the terms "transport" and "transporting" can refer to the movement of goods from one location to another. In some instances, the term "transport" can include transporting goods by means of a vehicle, aircraft, or ship.

As used herein, the term "container" can refer to any object that can be used to hold or house something during transport.

As used herein, the term "enclose" or "enclosing" can refer to the process of surrounding for protection. As used herein, the term "enclosed" or "encloses" can refer to being surrounding for protection.

As used herein, the term "recess" can refer to any area or space that is formed inside of another structure with an opening into the area or space from outside the structure.

As used herein, the term "translucent" can refer to permitting light to pass through but diffusing the light so that objects beyond cannot be clearly seen. As used herein, the term "opaque" can refer to not permitting light to pass through so that objects cannot be seen beyond.

The present disclosure relates to containers for transporting plants and methods of enclosing and transporting plants within a transportation container.

The apparatus and methods will now be described having reference to the accompanying Figures. Typically, plants can be transported in transportation containers. As shown in FIGS. 1 to 4, the present disclosure can be directed to a container 100 for transporting a live plant 102 growing in growing medium or soil 104. The container 100 can be constructed and configured to temporarily house a live plant 102, for example, but not limited to, a medicinal or decorative plant, during transportation and maintain the plant 102 in a live or growing state.

As shown in FIG. 1, in some embodiments, container 100 can comprise a base 106 and a lid 108. The lid 108 can be attached to the base 106 to form an outer portion 110 of the container 100. Container 100 can house a plant 102 within the outer portion 110 and protect the plant 102 from damage during transportation. The base 106 and lid 108 can be formed of any materials which are sufficiently rigid to protect the plant 102 and compatible with housing a live plant 102. In one embodiment, base 106 and lid 108 can be comprised of polypropylene, which confers relatively high rigidity, resistance to degradation (for example, chemical degradation from exposure to acids or bases), and resistance to fatigue due to subjection of repeated load stresses. In some embodiments, base 106 and lid 108 can be comprised of polypropylene homopolymer, hemp plastic, paper pulp, or a combination thereof.

In some embodiments, the lid 108 can be transparent to allow external light, such as natural light, pass through the outer portion 110 of container 100 to reach the plant 102. As discussed further below, in some embodiments, the lid 108 can be translucent or opaque.

During shipping or transportation, it can be desirable to provide ways to detect if plant containers 100 have been altered or tampered with before the plant 102 arrives to the destination or buyer. Therefore, in some embodiments, a tamper-resistant attachment mechanism 112 can be included to prevent separation of lid 108 from base 106 during transportation. As used herein, the term "tamper-resistant" can refer to any attachment means that can be used to detect if lid 108 has been separated from base 106 after they have been initially attached together. As shown in FIGS. 2B and 2C, in some embodiments, the attachment mechanism 112 can comprise a removable tear strip 112a attached to the bottom of lid 108 that can engage one or more horizontally positioned tabs 112b formed near the top of base 106. Tabs 112b can extend radially outward from the base 106. Once lid 108 is positioned over base 106, engagement of tear strip 112a with tabs 112b can prevent lid 108 and base 106 from being separated. The only way to separate lid 108 from base 106, without noticeable damage to container 100, would be to remove tear strip 112a from lid 108 by pulling the tear strip 112a away from lid 108 along a perforation line (not shown). Once the tear strip 112a has been removed, lid 108 can be removed from base 106. However, because the tear strip 112a must be removed prior to separation of lid 108 and base 106, an individual can easily examine the tear strip 112a portion of lid 108 and determine if the container 100 has been previously opened, for example, during transport.

In some embodiments, the attachment mechanism 112 can comprise a tamper-evident adhesive label 112c that can be placed across a seam formed between lid 108 and base 106 when lid 108 and base 106 are attached together. In some embodiments, separating the lid from the base can require cutting or breaking the adhesive label so that lid 108 can be released from base 106. As shown in FIGS. 3A and 3B, the tamper-evident label 112c can comprise, for example, one or more Tamperstrips™, placed over a seam 117 formed between lid 108 and base 106 when joined together. Tamper-evident label 112c can include a pair of pads 113a, 113b, each of which can be joined to one of either lid 108 or base 106. The pads 113a, 113b also can be joined together by one or more strips 115 of material which are not adhered to container 100a, but can be twisted, bent, or otherwise manipulated to put stress therein. Therefore, separating lid 108 from base 106 can require that strips 115 be cut or broken in order to release lid 108 from base 106. Since strips 115 have been twisted or otherwise manipulated to provide stress therein, cutting or breaking strips 115 can result in one end of strips 115 being displaced in relation to the opposing cut or broken end, thereby revealing to an observer that there has been tampering of the label 112b and container 100a. In some embodiments, label 112c can include anti-counterfeiting technology for added security, for example, but not limited to, holographic elements, serial numbers, and hidden inks. However, a person skilled in the art would appreciate that the particular tamper-resistant attachment mechanism 112 used to attach lid 108 to base 106 together is not a limitation of the invention. For example, in some embodiments, attachment mechanism 112 can comprise a child-resistant attachment mechanism. As used herein, the term "child-resistant attachment mechanism" can refer to any mechanism which requires a certain force, dexterity, or hand size for separation of lid 108 from base 106 that would make it significantly difficult for a child, for example, a child under the age of five to accomplish. In some instances, the term "child-resistant attachment mechanism" can refer to an attachment mechanism that meets or exceeds international child-resistant certification standards, for example, but not limited to, Child Resistant Closures ("CRC") certification.

As shown in FIGS. 1 to 4, in some embodiments, base 106 and lid 108 can be frusto-conical or conical in shape. As shown in FIG. 2B, base 106 can include a closed base end 114 and upward extending base sidewalls 116 that terminate at a base opening 118. In some embodiments, base opening 118 can be roughly circular in shape. Also formed inside base 106, below base opening 118, can be a base recess 120 configured to receive the plant 102 and a growth medium or soil 104. In other words, the recess can be filled with a desired plant 102 and a growth medium or soil 104 for supporting the growth of the plant 102. FIG. 2B shows a base recess 120 that forms a cube-shaped area for receiving a complementary cube-shaped growth medium or soil 104 (shown in FIGS. 3 and 4) and roots of plant 102. However, the particular size and shape of the base recess 104 are not limitations of the invention.

Figure 4:
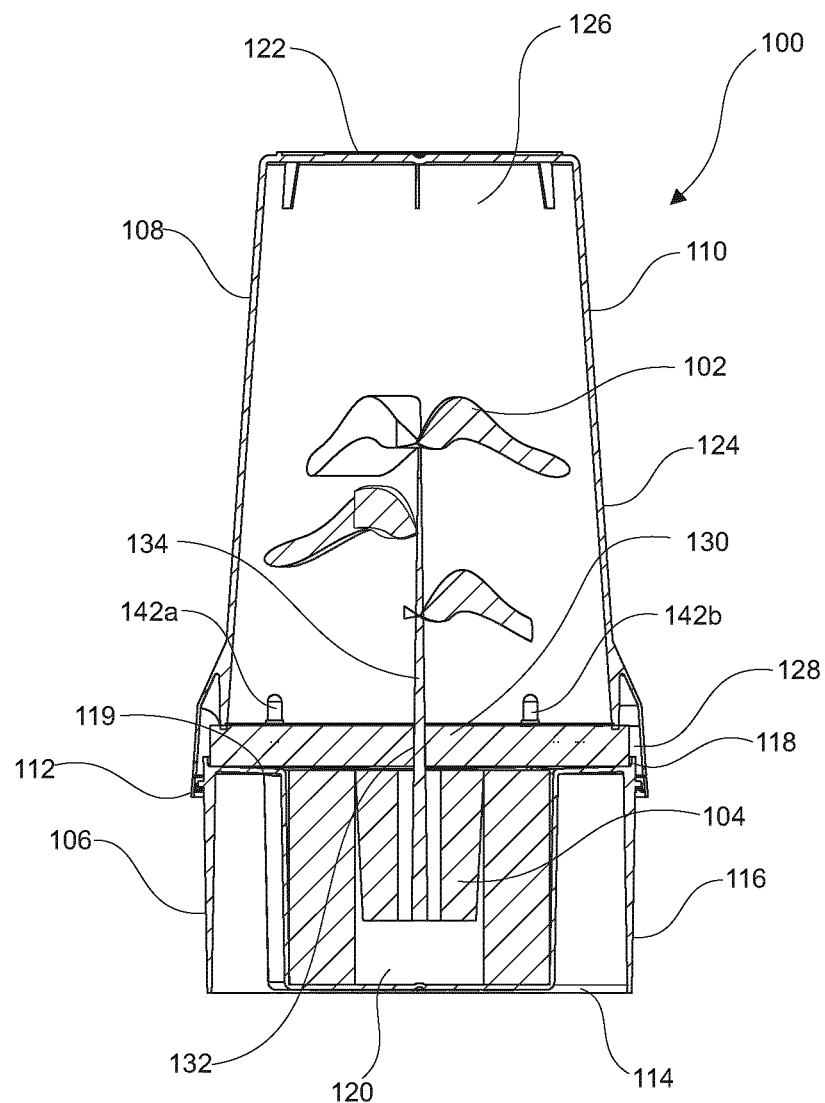
FIG. 4 is a cross-section view of the embodiment shown in FIG. 1 in use.

As shown in FIG. 2C, in some embodiments, lid 108 can include a closed lid end 122 and downward extending lid sidewalls 124 that terminate at a lid opening 128 (shown in FIG. 4). In some embodiments, lid opening 128 can be roughly circular in shape. As shown in FIG. 3, also formed inside the lid 108, above the circular lid opening 128, can be a lid recess 126 configured to extend over and enclose the plant 102 within the container 100. In some embodiments, the attachment of lid 108 to base 106, and enclosure of the plant 102 within the container 100, 100a, can occur by bringing the base opening 118 into engagement with the lid opening 128.

In some embodiments, lid opening 128 can measure 3 to 8 inches in diameter. In some embodiments, lid opening 128 can measure at least 3.5 inches in diameter. Utilization of a diameter of at least 3.5 inches can avoid the plant 102 contacting the inner surface of lid 108 that defines the lid recess 126, which can decrease the likelihood of condensation being generated between plant 102 and lid 108, thereby reducing the possibility of leaf rot.

Figure 5:
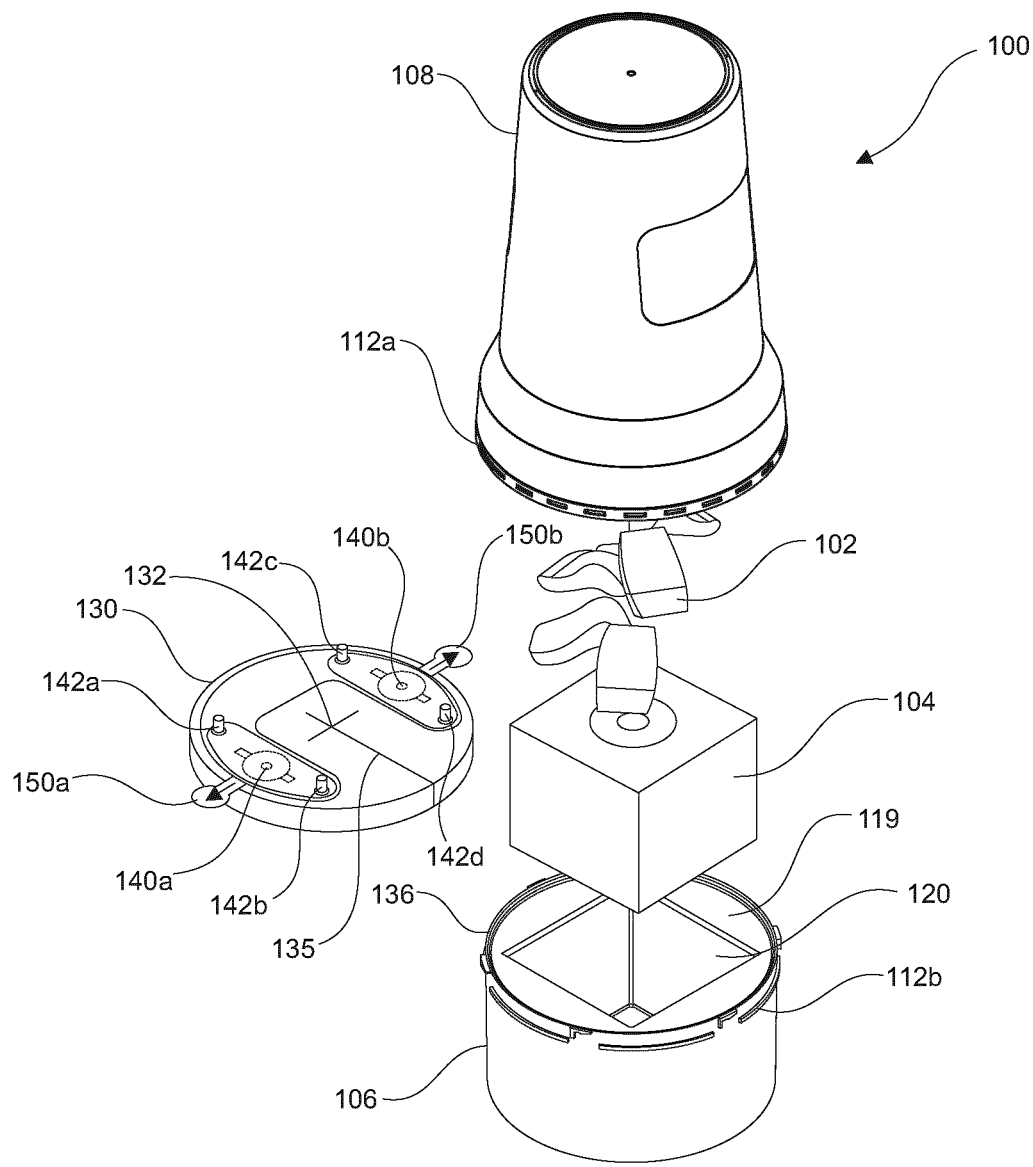
FIG. 5 is an exploded view of the embodiment shown in FIG. 1.

As shown in FIGS. 4 and 5, in some embodiments, a cover 130 can be disposed within base opening 118 and over the top surface of the growing medium or soil 104. In some embodiments, the cover 130 can assist in keeping the plant 102 retained within the base recess 120 during shipping. In some embodiments, an inward extending, flat surface 119 can be formed on base 106 slightly below the base opening 118 to assist with the positioning of cover 130 within base opening 118. In some embodiments, cover 130 can be disc-shaped to fit within a circular base opening 118 and made of foam. In some embodiments, the cover can be comprises of ethylene-vinyl acetate foam. As shown in FIGS. 4 to 6, the cover 130 can include hole 132, through which the stem 134 of a plant 102 can extend, and side slot 135. In some embodiments, hole 132 can be disposed toward the centre of cover 130.

During assembly, cover 130 can be positioned around the flat surface 119 and the stem 134 of the plant 102 can be inserted through the hole 132. Cover 130 can then be pressed down against the top surface of the growth medium or soil 104 and flat surface 119. In some embodiments, a inner side wall 136 can be formed on the base 106 slightly below base opening 118. The dimensions of cover 130 can be configured so that the an outer perimeter surface 137 of cover 130 can fit within the circular inner side wall 136 so that cover 130 can press against inner side wall 136 and can hold cover 130 in position. In this way, cover 130 can hold the plant 102 and growing medium or soil 104 within the base recess 120 during transport.

In some embodiments, container 100 can be used to transport dried plants, instead of live plant 102. For example, the stems of dried plants can be inserted through hole 132 of cover 130 in order to hold dried plants in position within container 100. Dried plants may not require growth medium 104 positioned in base recess 120. In some embodiments, the tamper-resistant attachment mechanism 112 can comprise a monolithic sheet of heat shrinkable plastic film (not shown) that covers at least a portion of outer portion 110. The plastic film can allow for an airtight enclosure within container 100, which can be particularly useful for transporting dried plants.

In some embodiments, container 100 can be used to transport cola from a plant. As a person skilled in the art would understand, a cola is the top and largest bud (sometimes called the apical bud) of the plant. In some embodiments, once dried and trimmed, the dried cola can be placed in container 100 for transportation, as described herein. In some embodiments, use of a child-resistant attachment mechanism can be used to make it difficult for a child to access cola contained within container 100.

An illuminating light source 140 can be attached to the upper surface of cover 130. In some embodiments, light source 140 can comprise one or more LED bulbs 142 and one or more batteries 144 to energize the LED bulbs 142. As an example, in the embodiments of cover 130 shown in in FIGS. 6A and 6B, two illuminated light sources 140a, 140b can be attached to the upper surface of cover 130. Each of light sources 140a,140b can further comprise two upward oriented LED bulbs 142a, 142b, 142c, and 142d. As shown in FIGS. 7A and 7B, lithium ion coin cell battery 144 can be in electrical communication with each or both LED bulbs 142a, 142b in order to energize the LED bulbs 142a, 142b. A LED printed circuit board 146 can be used to hold the LED bulbs 142a, 142b and electrically connect the LED bulbs 142a, 142b to the battery 144. Further, a battery holder 148 attached to the LED printed circuit board 146 can hold battery 144 to the LED printed circuit board 146. In some embodiments, LED bulbs 142a, 142b can be oriented approximately perpendicular on the LED printed circuit board 146 and the upper surface of the cover 130 so that the LED bulbs 140 can generate a light that shines upward onto the plant 102 from below.

Some buyers and users can desire that specific types of plants be in a vegetative growing stage, and not in a reproductive growing stage, when acquired. Because the growing stage of plant 102 can be controlled by exposure of plant 102 to light, in some embodiments, container 100 can include light source 140 to illuminate plant 102 in order to maintain plant 102 in a vegetative growing stage during transport, and avoid transformation of plant 102 into a reproductive growing stage.

As shown in FIGS. 6A, 6B, 7A, and 7B, during assembly of the light source 140, non-conducting battery isolation strip 150 can be positioned in the light source between the battery 144 and the LED printed circuit board 146. The battery isolation strip 150 can physically disrupt the electrical communication between the battery 144 and the LED bulbs 142. Prior to the use of the container 100, with the isolation strips 150 in this position, the battery cannot energize the LED bulbs 142 and the light source 140 cannot be illuminated. Removal of isolation strips 150 allows the battery 144 to energize the LED bulbs 142, thereby illuminating the light source 140. Therefore, in some embodiments, removal of the battery isolation strips 150 can be used to selectively activate and illuminate the light source 140, when desired. In some embodiments, during use of the container 100, battery isolation strips 150 can be removed from the light source 140 just before the lid 108 is attached to the base 106 for transport of the plant 102. In some embodiments, the battery isolation strips 150 can extend out past the circumference of the circular base opening 118 and can physically block the lid 108 from being attached to the base 106 until the isolation strips 150 are removed. Such a configuration can help ensure that the LED bulbs 142 are illuminated prior to the lid 108 being attached to the base 106 for transport. However, a person skilled in the art would realize that use of battery isolation strips 150 is not a limitation of the invention and other mechanisms could be used to connect or disrupt the electrical connection between battery 144 and LED bulbs 142 when bulbs 142 are not to be illuminated. For example, a switch (not shown) could also be used to allow electrical energy flow to battery 144 to LED bulbs 142.

As shown in FIG. 6B, is some embodiments, a portion of light sources 140a, 140b can fit within corresponding cover openings 152a, 152b formed in cover 130 so that the LED bulbs 142a, 142b are positioned near to the upper surface of the cover 130. The position of the light sources 140a, 140b within cover openings 152a, 152b can be maintained during transport by laying an foam sheet 154 with an adhesive applied to the bottom that overlies the LED printed circuit boards 146a, 146b and the upper surface of cover 130. The foam sheet 153 can adhere to both the light source 140 and the cover 130 with an adhesive. In some embodiments, foam sheet 154 can be comprised of ethylene-vinyl acetate. In some embodiments, lid 108, when attached to base 106, can push down against light source 140 thereby holding light source 140 in place on cover 130 within the cover opening 152, during transport.

As shown in FIGS. 8A and 8B, in some embodiments, cover 130a can be sandwiched between an upper foam sheet 154a and a lower foam sheet 154b so that light sources 142a, 142b can be maintained during transport. Similar to above, an adhesive can be applied to foam sheets 154a, 154b to hold them attached to cover 130a and foam sheets 154a, 154b can be comprised of ethylene-vinyl acetate.

As mentioned previously, lid 108 can be translucent or opaque to ensure inconspicuous transport of the plant 102 until it reaches the destination. In some embodiments, inner surface 156 (shown in FIG. 3) of an opaque or translucent lid 108 can further be reflective in order to reflect light back into the lid recess 126 that shines on inner surface 156. A reflecting inner surface 126 can help ensure that as much of the upward directed light as possible reaches different parts of the plant 102. Without wishing to be limited to any particular theory, the reflective inner surface 156 may decrease the effect of shadows created on the upper parts of the plant 102 by the lower parts of the plant 102. In some embodiments, the inner surface 156 can be textured. As used herein, the term "textured" can refer to a rough surface or a surface having a raised pattern. The textured surface can reflect scattered or diffuse light from light received from the illuminated light source 140. Again, without wishing to be limited to a particular theory, the scattered light reflected off a textured inner surface 156 may result in light in the lid recess 126 being directed in many different directions, which may help ensure that as many parts of the plant 102 are bathed in as much light as possible.

In operation, in some embodiments, the grower can fill the base recess 120 with the growing medium or soil 104 and plant 102. The cover 130 can then be positioned near base opening 118 and stem 134 of plant 102 can be slid into hole 132 of cover 130 using side slot 135. The cover 130 can then be pressed down against the flat surface 119 and the top surface of the growing medium or soil 104 so that the cover 130 can fit within circular base opening 118. The light source 140 can be illuminated, for example, by removing the battery isolation strips 150 resulting in the battery 144 energizing LED bulbs 142. The lid 108 can then be attached to base 106 by bringing circular lid opening 128 into contact with circular base opening 118 so that tear strip 112a engages the tabs 112b. In some embodiments, illuminated light source 140 can provide full spectrum light for over 140 hours. As used herein, the term "full spectrum light" can refer to light that contains substantially all of the wavelengths of light that are useful to plants. In some embodiments, the illuminated light source can be fully illuminated for an initial 72 hours and then can diminish gradually for another 72 hours until the light source does not produce any further light.

Once plant 102 is enclosed in container 100, container 100 and plant 102 can be shipped or transported.

It should be apparent, however, to those skilled in the art that many more modifications besides those already described are possible without departing from the inventive concepts herein. The inventive subject matter, therefore, is not to be restricted except in the scope of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly reference.

What is claimed is:

1. A container for transporting a plant, comprising:
   a base defining a base recess for receiving the plant and a growing medium or soil;
   a lid defining a lid recess, the lid being attachable to the base such that the lid extends over and encloses the plant within the container;
   a cover mountable to the base for holding the plant within the base recess;
   at least one light source mounted to an upper surface of the cover and positioned to illuminate light to the plant; and
   a tamper-resistant attachment mechanism mounted on the container for attaching the lid and the base together during transport.

2. The container according to claim 1, wherein the cover is mountable to the base within the base recess and configured to abut against the growing medium or soil when contained the base recess.

3. The container according to claim 1, wherein the base and the lid are frusto-conical or conically-shaped.

4. The container according to claim 3, wherein the diameter of the lid recess measures at least 3.5 inches.

5. The container according to claim 3, wherein the cover is a disc configured to fit within a base inner side wall formed on the base, and wherein the disc further comprises a hole configured to receive a stem of the plant positioned within the base recess, and a side slot that extends from a perimeter edge of the disc to the hole.

6. The container according to claim 5, wherein the disc is comprised of foam, and wherein the dimensions of the disc are configured to press against the inner side wall and hold the disc in position.

7. The container according to claim 5, wherein the disc is comprised of ethylene-vinyl acetate foam.

8. The container according to claim 1, wherein each of the at least one light source comprises one or more LED bulbs and one or more batteries energizing the LED bulbs.

9. The container according to claim 8, wherein each of the at least one light source comprises two LED bulbs and one battery in electrical communication with the two LED bulbs.

10. The container according to claim 8, wherein the one or more LED bulbs are oriented perpendicularly to the upper surface of the cover and the LED bulbs generate a light that shines upward onto the plant.

11. The container according to claim 8, wherein each of the at least one light source further comprises a removable battery isolation strip positioned in the light source to interrupt the electrical communication between the two LED bulbs and battery, and wherein removing the battery isolation strip causes the batteries to energize the LED bulbs and illuminate the light source.

12. The container according to claim 1, wherein the lid, when attached to the base, pushes down on the at least one light source and holds the at least one light source in position mounted on the cover.

13. The container according to claim 1, wherein the lid is translucent or opaque.

14. The container according to claim 1, wherein the lid recess is defined by a lid inner surface, and wherein the lid inner surface reflects light.

15. The container according to claim 14, wherein the inner surface is textured to diffuse light reflected by the inner surface.

16. The container according to claim 1, wherein the attachment mechanism comprises a perforated removable tear strip mounted to a bottom edge of the lid and one or more horizontally positioned tabs formed on the base extending radially outward from an exterior surface near the top of the base and wherein attachment of the base to the lid comprises the tear strip engaging the one or more horizontally positioned tabs to prevent the lid and the base from being separated after being initially attached together.

17. The container according to claim 1, wherein the attachment mechanism comprises a tamper-evident adhesive label placeable across a seam formed between the lid and the base after being initially attached together, and wherein separating the lid from the base requires cutting or breaking the adhesive label.

18. The container according to claim 1, wherein the plant is a medicinal or decorative plant.

19. The container according to claim 1, wherein the plant is maintained in a vegetative growing stage during transport.

20. A method of enclosing a plant within a transportation container, the method comprising the steps of:

positioning the plant and a growth medium or soil within a base recess defined by a base of a container;

mounting a cover to the base, the cover mounted over the base recess and abutting the growth medium or soil to hold the plant within the base;

illuminating at least one light source mounted to an upper surface of the cover and positioned to illuminate light to the plant; and enclosing the plant within the container by attaching a lid to the base so that the lid extends over the plant and encloses the plant within the container.

21. The method according to claim 20, wherein the illuminating the at least one light source step comprises energizing at least one LED bulb with at least one battery by removing a battery isolation strip positioned to disrupt an electrical communication between the at least one LED bulb and the at least one battery.

22. The method according to claim 20, wherein the enclosing the plant within the container step comprises engaging a tamper-resistant attachment mechanism mounted on the lid for attaching the lid and the base together during transport.

23. The method according to claim 20, further comprising the step of:

transporting the plant within the transportation container.

* * * * *